July 28, 1942. G. A. TINNERMAN 2,291,290
SHEET METAL NUT
Filed Oct. 6, 1941
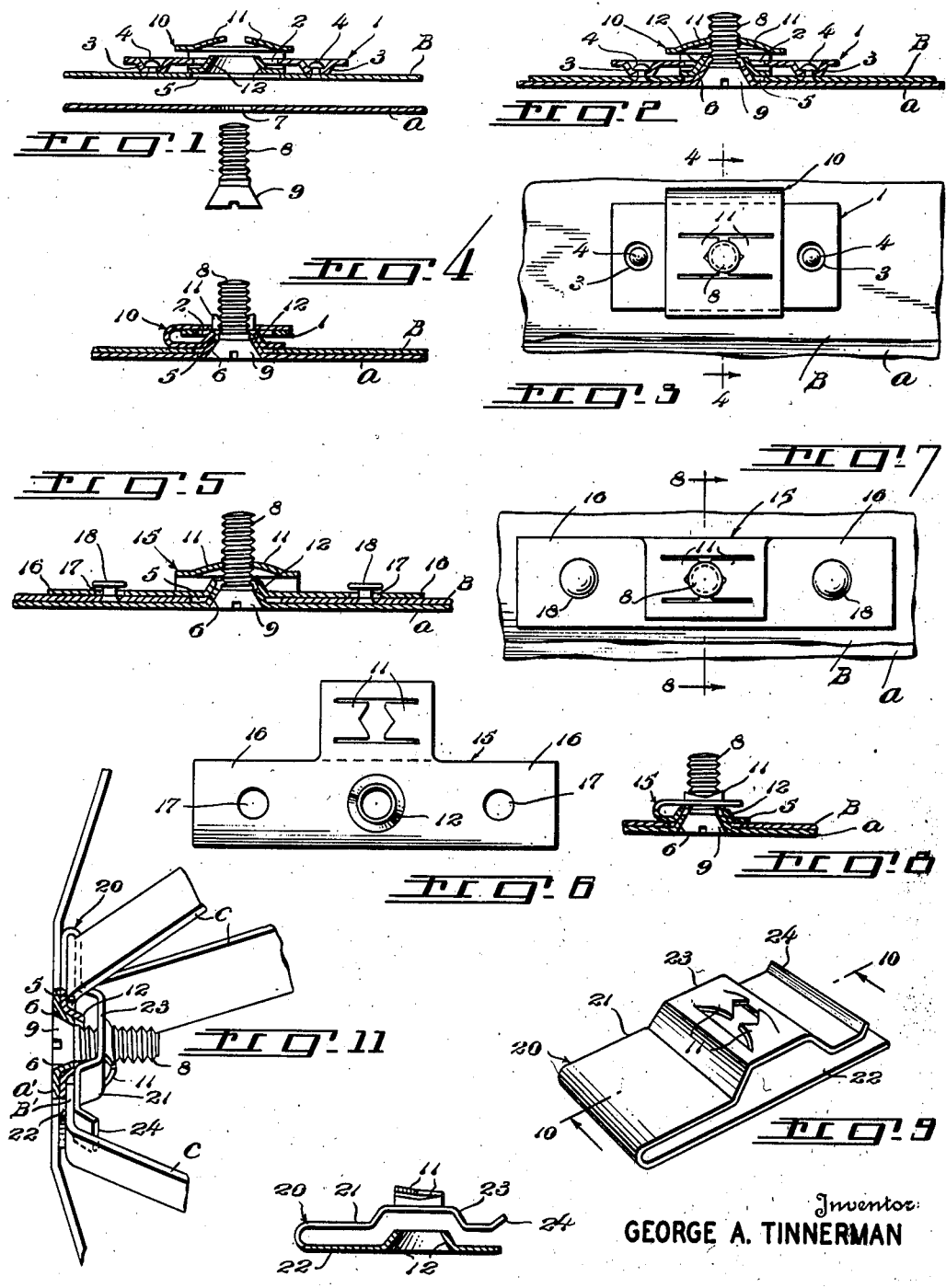
Inventor
GEORGE A. TINNERMAN Patented July 28, 1942

2,291,290

UNITED STATES PATENT OFFICE 2,291,290

SHEET METAL NUT

George A. Tinnerman, Cleveland, Ohio, assignor to Tinnerman Products, Inc., Cleveland, Ohio, a corporation of Ohio Application October 6, 1941, Serial No. 413,854

10 Claims. (Cl. 85—36)

This invention relates in general to sheet metal nut devices and deals, more particularly, with improvements in means for attaching such devices on one of the parts of an assembly preparatory to the application of a cooperating bolt or screw thereto for securing said parts, while otherwise providing a countersunk, flush-type fastening installation in the finally applied, tightened position of the bolt, screw or other stud member.

The invention is directed, further, to such sheet metal nut devices provided with means adapted to cooperate with the head of the bolt or screw to draw inwardly the metal adjacent the bolt opening in the part secured in a manner to form automatically a countersink for the head of the bolt or screw as the same is drawn taut in providing an assembly having a smooth, even, exterior surface in which the bolt or screw head is flush with the general contour of the part secured thereby.

The invention has particular application and use in the fabrication of aircraft and other vehicles wherein present day streamlining makes it necessary to provide the various fastening devices in such a manner that the streamlined exterior of the vehicle body will be unobstructed by any projecting portion of the bolt or screw member of the fastening device.

A primary object of the invention, therefore, is to provide for use in such a fastening installation, an improved form of fastener embodying all the foregoing characteristics, and further, so constructed and arranged as to provide an adjustable floating mounting for the nut portion thereof in order to compensate for possible manufacturing variations and other irregularities in the parts of the assembly during the final securing of the same in a completed installation.

A further object of the invention is to provide a sheet metal fastener of this character comprising a simple, inexpensive retaining means designed to provide an adjustable, floating mounting for a nut device together with means cooperating with the head of the bolt or screw as the same is drawn taut to provide automatically a countersink therefor in the part secured in defining an assembly having a smooth, even, exterior surface, as and for the purposes described.

A further, more specific, object of the invention is to provide a sheet metal fastener of the kind described embodying an improved form of sheet metal retainer adapted to provide such an adjustable floating mounting for a nut device, with said nut device including means having the combined purpose of cooperating with the retainer in attached relation and cooperating with the head of a bolt or screw to form automatically a countersink therefor in the part secured in defining an assembly having a smooth, even, exterior surface.

Still another object of the invention is for the provision of various forms of such fasteners in the manner of simple, lightweight, one-piece sheet metal nut devices which are relatively cheap and inexpensive to manufacture, and lend themselves to economical quantity production in that they may be produced at comparatively low cost from ordinary sheet metal strip stock with little loss or waste of material.

Further objects and advantages, and other new and useful features in the construction, arrangement and general combination of parts of the invention will be readily apparent to those skilled in the art as a description thereof proceeds with reference to the accompanying drawing, for purposes of illustration but not of limitation, in which like reference characters designate like parts throughout the same, and in which:

Fig. 1 is a sectional view of an assembly illustrating one form of the invention embodying a retainer providing a floating mounting of a nut device on one of the parts of the assembly with the bolt or screw about to be applied to secure a cooperating part thereto;

Fig. 2 is a sectional view similar to Fig. 1 showing the parts of the assembly in finally secured relation with a countersink automatically formed by the bolt or screw head seating the same in flush relation with the surrounding material of the part secured thereby;

Fig. 3 is a plan view of Fig. 2; and,

Fig. 4 is a sectional view taken on line 4—4 of Fig. 3, looking in the direction of the arrows.

Fig. 5 is a sectional view similar to Fig. 2 showing an assembly embodying another form of the invention;

Fig. 6 is a plan view illustrating the formation of a blank for providing the sheet metal nut device shown employed in Fig. 5;

Fig. 7 is a plan view of Fig. 5; and,

Fig. 8 is a sectional view taken on line 8—8 of Fig. 7, looking in the direction of the arrows.

Fig. 9 is a perspective view of a sheet metal nut device in a further form of the invention;

Fig. 10 is a side view of this form of the fastener shown partly in section, as along line 10—10 of Fig. 9; and, Fig. 11 is a side elevational view of an assembly, partly in section, embodying the sheet metal fastener shown in Figs. 9 and 10.

In the manufacture of many sheet metal constructions, particularly aircraft and other structures requiring a smooth, exterior surface for streamlining purposes, it is necessary for the parts of an assembly to be secured by bolt or screw fastenings in a manner to be readily detachable while otherwise defining a smooth exterior surface in the areas engaged by the heads of the bolts or screws. In this respect, the present invention has particular application in assemblies for detachably locking in place panel-like members such as cover plates, closure panels and similar parts which cover or conceal the service openings in the body of an aeroplane or motor vehicle, as, for example, in a cowling assembly or the mounting of a radiator casing, hood, or the like.

In many fastening assemblies, particularly those known as blind locations, wherein it is inconvenient or impossible for an operator to hold a nut as the cooperating bolt or screw is applied thereto, it is necessary or desirable for the nut device to be permanently attached to its associated part and thus in position to receive readily the cooperating bolt or screw either in the initial fastening of an assembly or when the parts are disassociated and resecured. In quantity production, it is found frequently that the bolt passages in the respective parts to be secured cannot always be provided with such exactness as to align properly in the final securing of said parts. Accordingly, to overcome this objection, it is the usual practice to provide the bolt passage in the supporting part of sufficiently large size to receive the bolt or screw in any necessary position of application, with the nut attached to said supporting part in a lose, floating mounting whereby the same may be shifted or adjusted as required to threadedly engage the bolt or screw properly in securing the parts of the assembly in the most effective manner.

In such an adjustable or floating mounting for the nut device, the present invention contemplates further an arrangement whereby the part engaged by the bolt or screw head includes a countersink which is formed automatically upon tightening of the bolt or screw to lie in the contour of the part secured and thereby provide a flush-type fastening assembly having a smooth exterior surface. In thus providing for an automatic upsetting of the countersink, an important advantage is obtained in that there is eliminated a separate dimpling operation which ordinarily would be required, while said countersink otherwise is formed in the most natural manner for positively securing the parts of the assembly firmly and rigidly with the greatest degree of effectiveness. In the securing of aluminum parts, for example, which are relatively soft and malleable, the instant fastening means is especially advantageous in that maximum strength and durability is provided in the areas fastened without adding materially to the weight of the assembly and this, of course, is of paramount importance in the fabrication of aircraft and similar structures.

Referring now, more particularly, to the drawing, Figs. 1-4 inclusive show one form of the improved fastening means of the invention as provided for securing two or more complementarily fitted superposed or juxtaposed parts A, B, in an installation. Such parts may be of any suitable material with the secured portions thereof usually assuming the form of complemental plates of which part B may be termed the supporting plate to which the nut and retainer therefor is attached at the rearward side of the assembly. For purposes of illustration, said parts A, B, are referred to as sheet metal panels, and in an aircraft construction, for example, said panels preferably are constructed of aluminum with the supporting panel B representing a portion of an aeroplane body adjacent a service opening therein, with part A being a portion of the cover plate or fairing secured thereto to cover such service opening but capable of being easily removed, if desired, to permit access to such service opening for any desired purpose. In a further respect, it will be understood that part B may be a portion of any framework which is provided with the required number of nut devices in spaced relation to receive a corresponding number of bolt fastenings for securing thereto the body panel or streamlined fairing represented by part a.

In the present example, the sheet metal nut is provided with an adjustable, floating mounting on part B of a retainer, designated generally 1, comprising a simple, inexpensive sheet metal device having a nut attaching opening 2 intermediate a pair of downwardly extending depressions 3. These depressions have apertures for welding purposes or for receiving attaching rivets 4 to permanently secure the retainer to the rearward side of supporting part B over an enlarged bolt passage 5 therein which permits the application of a securing bolt or screw therethrough in any necessary position of adjustment. The arrangement otherwise is such that the depressions 3 maintain the body of the retainer in predetermined spaced relation to the adjacent rearward surface of part B while said rivets 4 preferably are made flush with the forward side thereof in order to permit the associated part a to be brought into close uniform abutting engagement therewith in the final fastening of the assembly. In the part a to be secured to said supporting part B, the bolt passage 7 is only slightly larger than necessary to receive the shank of a bolt or screw 8 having a tapered, generally frusto-conical head 9 adapted to provide a countersunk fastening assembly, as presently to be described.

Adjustably attached to part B by the retainer 1, is a sheet metal nut, designated generally 10, in the form of a generally U-shaped device comprising a pair of arms adapted to embrace the body of the retainer in interconnected relation therewith. The sheet metal nut is a relatively cheap article of manufacture in that it may be produced by simple stamping and forming operations from a comparatively small, inexpensive section of any suitable sheet metal, preferably of a spring metal nature, such as spring steel or cold rolled metal having spring-like characteristics. While the general U-shaped construction of the sheet metal nut may be provided of sheet metal sections of various outlines, from the standpoint of most economical quantity production, the same is most advantageously formed from a generally rectangular blank obtained from ordinary sheet metal strip stock with a minimum loss or waste of material.

In a preferred construction of said generally U-shaped sheet metal nut 10, the upper arm is provided with integral bolt or screw engaging means in the form of cooperating tongues 11, or the like, which are pressed, stamped, extruded or otherwise struck and formed from the sheet metal section to project out of the plane thereof and define a thread opening for threadedly engaging the bolt or screw in the manner of a nut. The lower arm of the sheet metal nut is provided with a raised boss or protuberance defining a drawn collar or hub 12 in the nature of a frustum of a cone having an opening concentrically arranged with the thread opening between the extremities of tongues 11 and otherwise forming what may be termed a cone-shaped female die corresponding substantially to the cone-shaped bolt or screw head 9 to cooperate therewith to provide a deformation of the metal around the bolt passage 7 in the part $a$ to be secured in the final fastening of the parts of the assembly.

As best seen in Fig. 1, said drawn collar or hub 12 also serves as a substantial indexing or positioning means to maintain the sheet metal nut in loosely attached relation with the retainer by being received in the opening 2 therein from the inner side of said retainer to cooperate with the arm carrying the bolt or screw-engaging means 11 on the outer side thereof. It will be understood that the body of the retainer surrounding the opening 2 is spaced from the adjacent part B in a manner whereby the arms of the sheet metal nut may be applied readily to embrace the retainer with said hub 12 on the lower arm passing below the retainer body to be snapped into said opening 2 therein with sufficient clearance to provide the desired adjustable, floating mounting of the thread engaging means 11 over the bolt passage 5 in said part B. To this end, the lower or attaching arm of the sheet metal nut is reduced in width to provide for any required lateral shifting of the nut between the depressions 3 of the retainer so that the thread opening defined by the tongues 11 on the upper arm may be disposed in any necessary location for threadedly engaging the bolt or screw 8, thereby allowing the parts $a$, B, to be exactly and precisely fitted in properly assembled relation before the bolt or screw 8 is applied to secure these parts in the final fastening thereof.

The invention fully contemplates the provision of other thread engaging means equivalent to the tongues 11 on the upper arm of the generally U-shaped sheet metal device 10 in the manner of a separate threaded nut spot-welded, riveted or otherwise united thereto, but such arrangements are relatively expensive and make the cost of the fasteners prohibitive, in many cases, because of the added step in manufacture which is required in addition to a separate assembling operation and the cost of a lock nut or lock washer for providing the bolt or screw with means preventing loosening or displacement thereof from tightened fastening position.

In the preferred construction shown, the above noted objections are obviated and most advantageously eliminated in the provision of said fastener 10 in a unitary, inexpensive, one-piece, sheet metal product in which the thread engaging means for the bolt or screw are integrally provided on the upper arm of the device at very low cost in the manner of simple tongue elements 11, or the like. Referring to Figure 3, it will be understood, more particularly, that such thread engaging elements 11 are best provided from the sheet metal material of the fastener by an aperture intermediate spaced parallel slits which form the cooperating substantial tongues having spaced extremities defining the desired thread or thread opening corresponding substantially to the root diameter of the bolt or screw for threadedly engaging the thread thereof. Said tongue elements 11 otherwise are preferably formed to project outwardly out of the plane of the arm, as shown in Figure 2, and are bent intermediate their lengths in substantial ogee formation to provide for the maximum strength obtainable to withstand the tightening action of the bolt or screw as it is advanced to finally applied fastening position.

Said thread engaging means may be pressed, stamped, extruded or otherwise provided on the fastener in any suitable form or construction so long as the same threadedly engage with the thread of the bolt or screw and, in this relation, the present invention fully contemplates the provision of such integral thread engaging means in various other similar and related forms, as in the manner of a substantial perforated protuberance which is pressed from the sheet metal and shaped to provide a helical thread or thread opening, or otherwise has the walls thereof tapped to provide a plurality of threads for threadedly engaging the bolt or screw. However, it has been found that such thread engaging means prepared in the form of cooperating, yieldable tongues 11, as shown, are the most efficient and most practical in that they are possessed of unusual inherent strength and will not collapse or pull through when the bolt is tightened, nor loosen under continuous strain and vibration in the installation. This takes place by reason of the fact that the sheet metal material from which such tongues are formed is of less thickness than the pitch of spacing between adjacent thread convolutions of the bolt or screw, wherefore the extremities of said tongues tend, more effectively, to move toward each other and dig into the grooves intermediate adjacent thread convolutions when tightened therewith and otherwise become embedded in the root of the bolt or screw in locked, frictional fastening engagement therewith in applied fastening position. Thus, in the present example, the tongues 11 are shown as extending out of the plane of the upper arm of the fastener in substantial ogee formation and provided preferably with diamond-shaped or notched extremities, Figure 3, forming substantial biting jaws designed to cut into the root of the bolt and adjacent thread surfaces thereon in positive locking relation therewith in the most effective manner. There is thereby eliminated the necessity for a separate, auxiliary locking means such as a lock nut or lock washer and this, in mass production, makes possible a considerable saving not only in the cost of such locking devices, but also, in the expense and labor involved in the tedious, time consuming assembling operations and other added steps in manufacture which such auxiliary locking means require. It is to be understood, however, that the present invention is not limited in any manner or form to the illustrated construction of the thread engaging means but rather, comprehends also, various other similar and related forms of such tongues or equivalent thread engaging elements.

In use, it will be understood from the foregoing that the sheet metal fastener 10 is attached substantially as shown in Fig. 1 to provide a floating mounting of the thread engaging means 11 on part B over the enlarged bolt passage 5 therein. The part $a$ may then be fitted thereto in any position necessary to provide an exact, precise assembly of these parts with the assurance that in whatever relative position the bolt passage 7 in part *a* is disposed, the nut device 10 may shift on part B as required to permit the bolt or screw to be received in the opening 5 therein and pass readily through the opening in the drawn collar 12 on the lower arm of the fastener into threaded engagement with the tongues 11 on the upper arm thereof. The said bolt passage 7 in part *a* need be only large enough to pass the bolt shank, and accordingly, when the bolt or screw 8 is tightened, the conical head 9 thereof engages the material surrounding said passage and deforms the same against the conical hub or collar 12 to form automatically a countersink 6, for said bolt or screw head, substantially as shown in Figs. 2 and 4. The action is such that the said collar or hub 12 serves substantially as a female die in cooperation with the bolt or screw head 9 to gradually depress the material of part *a* surrounding said bolt passage 7, thereby forming a natural countersink 6 in which said bolt or screw head is disposed flush with the general contour of said part *a* in presenting a smooth, exterior surface in the general streamlined design of the structural body defined thereby, and providing a firm, rigid and positive fastening of the parts secured with the greatest degree of effectiveness.

Figs 5-8 inclusive show a further embodiment of the invention in which a generally U-shaped sheet metal nut device is provided for use in the manner of that just described and is similarly constructed except in the means for attaching the same to the supporting part B in an adjustable, floating mounting. The device 15 is constructed from a blank such as shown in Fig. 6 which is bent, substantially along the dotted line shown, into a generally U-shaped construction, with the upper arm provided with thread engaging means in the form of integral tongues 11, or the like, and the lower arm having a boss or protuberance defining a frusto-conical hub or drawn collar 12. Said lower arm includes suitable flanges 16 having openings 17 receiving rivets, eyelets, or the like 18 for attaching the fastener to the rearward side of part B with said thread engaging means overlying the bolt passage 5 therein. Preferably, said openings 17 in the flanges are formed oversize with the rivets 18 having enlarged heads overlapping such openings to maintain the sheet metal nut device in proper attached position on said part B but capable of limited sliding movement to provide the same in a floating mounting for adjustment purposes. The device thus constructed, accordingly, is adapted for use substantially as shown in Figs. 5 and 7 wherein the rivets 18 in the enlarged openings 17 of the base flanges are shown providing the desired floating attachment of the nut device on the supporting part B and the drawn collar 12 on the lower arm thereof, Figs. 5 and 8, is adapted to cooperate with the conical head 9 of the bolt to form automatically a countersink 6 in the part *a* secured to said supporting part, substantially in the manner and for the purposes described with reference to the form of the invention shown in Figs. 1-4 inclusive.

Figs. 9-11 inclusive disclose a further form of the invention wherein a substantially U-shaped sheet metal nut device, similar to that in the previously described forms of the invention, is attached in an adjustable, floating mounting on the supporting part of an assembly by being designed to embrace such supporting part on its opposite sides over a stud passage therein. For purposes of illustration, this form of the invention is shown in connection with the mounting of a hub fairing attached to the landing wheel brake of an aeroplane, for example. The supporting part B' in such an assembly includes the mounting tripod elements C attached to the brake and is provided with an opening 5 serving both as a stud passage and an attaching opening by which the sheet metal nut device may be attached in floating mounting on said supporting part in position to receive the bolt or screw fastening 8. The hub fairing associated with said supporting part B', or mounting tripod, is designated generally *a'* and usually assumes the form of a panel-like member which is desired to be secured by said bolt or screw 8 with the head 9 thereof suitably countersunk to be flush with and lying in the general contour of said hub fairing.

The sheet metal nut device 20 is generally similar to those previously described in comprising an upper arm 21 carrying thread engaging means 11 and a lower arm 22 provided with a boss or protuberance defining a generally frusto-conical hub or drawn collar 12. Preferably the upper arm is bent into a raised portion 23 for supporting said thread engaging means 11 with suitable spacing from the supporting part B' in attached position thereon, while the free end thereof is formed into an outwardly inclined cam surface 24 to facilitate the application of the generally U-shaped fastener over an edge of said supporting part to embracing relation therewith. In the attached position of the fastener as shown in Fig. 11, the arms 21, 22, thereof engage opposite sides of said part B' with the drawn collar or hub 12 received in the opening 5 therein to serve as an indexing or positioning means retaining the device in attached position. Said opening is of size loosely receiving said collar 12 such that the nut device is provided in a floating mounting on said part B' and may be shifted laterally or otherwise adjusted as required for the thread engaging means 11 thereof to engage the bolt or screw 8 applied thereto incidental to the assembly of said part *a'* in exact, predetermined relation to said supporting part B'. As the bolt or screw is drawn taut, the conical head 9 thereof cooperates with the drawn collar 12 of the sheet metal fastener to deform the material surrounding the stud passage in said part *a'* in providing automatically a countersink 6 for said bolt or screw head and a firm, rigid and positive connection of the parts secured, substantially in the manner of the previously described forms of the invention.

In any form of the invention, it will be appreciated that an important advantage resides in the fact that there is no necessity for dimpling or otherwise preforming the depression for receiving the head of the bolt or screw in countersunk, flush relation to the part secured. There is thus eliminated an otherwise necessary separate step in manufacture with the attendant saving in cost of tools and labor in this respect. Furthermore, the fastening arrangement is such that due provision is made for manufacturing variations and irregularities in the parts secured in that the same may be precisely and exactly fitted in properly assembled relation, with the nut device being adjustable as necessary to compensate for any discrepancy in the final relative location of the bolt passages in the respective parts in order to receive the bolt or screw fastening and permit the threading thereof with the nut portion of the fastener in the manner necessary to provide a strong and durable fastening installation. In this relation, the effectiveness of the fastening assembly is materially enhanced in the provision of the countersink for the bolt or screw head after the parts secured are positioned in properly assembled relation inasmuch as the countersink automatically formed on tightening of the bolt or screw is necessarily provided with the greatest accuracy and efficiency according to the thickness and other characteristics of the parts secured in any particular installation, while said parts otherwise are secured in an unusually firm, rigid and positive connection adapted to withstand the most severe conditions of shock, vibratory motion and the like, for the purposes intended.

The nut device, in any form of the invention, preferably is constructed of relatively thin sheet metal, the thickness of which is selected according to service requirements and the predetermined size of the parts secured. The nut devices are most effective when provided of spring metal suitably spring tempered and otherwise treated to give the desired toughness and hardness, particularly in the case of devices which are put to heavy duty in installations where extreme vibratory motion takes place. A cheap but effective fastener may be provided from cold rolled metal, such as cold rolled steel, which is untempered but of a spring metal nature and preferably harder than that of the cooperating bolt or screw employed therewith in providing an efficient and reliable fastening means adapted for a long period of satisfactory service and use.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A fastener for providing a flush-type bolt or screw fastened installation comprising a sheet metal body carrying thread engaging means, means adapted for attaching the fastener to a supporting part, and a portion having an apertured protuberance underlying and extending toward said thread engaging means, said protuberance being adapted to receive a bolt or screw applied through a bolt passage in a sheet metal part to be secured to said supporting part and engaged with said thread engaging means to connect said parts, said bolt or screw having a countersinking head and said protuberance being formed to cooperate with said head in engaging opposite faces of said sheet metal part adjacent the bolt passage therein to deform and draw the surrounding metal into a countersink seating said bolt or screw head in countersunk relation to said sheet metal part.

2. A fastener for providing a flush-type bolt or screw fastened installation comprising a sheet metal body having a section provided with integral thread engaging means struck and formed therefrom and a return bent section defining means adapted for attaching the fastener to a supporting part, an apertured generally frusto-conical protuberance provided on said return bent section underlying and extending toward said integral thread engaging means, said protuberance being adapted to receive a bolt or screw applied through a bolt passage in a sheet metal part to be secured to said supporting part and engaged with said thread engaging means to connect said parts, said bolt or screw having a frusto-conical countersinking head and said generally frusto-conical protuberance being formed to cooperate with said head in engaging opposite faces of said sheet metal part adjacent the bolt passage therein to deform and draw the surrounding metal into a countersink seating said bolt or screw head in substantially flush relation to said sheet metal part.

3. The combination with a sheet metal supporting part of a fastener for providing a flush-type bolt or screw fastened installation comprising a sheet metal body having a section carrying thread engaging means and a section having lateral flange means for attaching the fastener to said supporting part and provided with a generally frusto-conical protuberance underlying and extending toward said thread engaging means, said protuberance being adapted to receive a bolt or screw applied through a bolt passage in said sheet metal part to be secured to said supporting part and engaged with said thread engaging means of the fastener to connect said parts, said bolt or screw having a frusto-conical countersinking head and said generally frusto-conical protuberance being designed to cooperate with said head in engaging opposite faces of said sheet metal part adjacent the bolt passage therein to deform and draw the surrounding metal into a countersink seating said bolt or screw head in countersunk relation to said sheet metal part.

4. A fastener for providing a flush-type bolt or screw fastened installation comprising a generally U-shaped sheet metal body defining a pair of spaced arms extending in the same general direction and adapted to receive therebetween a supporting part having a bolt passage, one of said arms being bent into a raised portion provided with integral thread engaging means struck and formed therefrom, the other arm being provided with an apertured generally frusto-conical protuberance underlying and extending toward said thread engaging means and adapted to be received in the bolt passage in the supporting part from one side thereof to maintain the fastener in attached relation thereon with said raised portion spaced from the opposite side of said supporting part for resiliency, said protuberance being adapted to receive a bolt or screw applied through a bolt passage in a sheet metal part to be secured to said supporting part and engaged with said thread engaging means to connect said parts, said bolt or screw having a frusto-conical countersinking head and said generally frusto-conical protuberance being designed to cooperate with said bolt or screw head in engaging opposite faces of said sheet metal part adjacent the bolt passage therein to deform and draw the surrounding metal into a countersink seating said bolt or screw head in countersunk relation to said sheet metal part.

5. A fastener for providing a flush-type bolt or screw fastened installation comprising a body having a portion carrying thread engaging means, and a portion having an apertured protuberance underlying and extending toward said thread engaging means, and means adapted for attaching the fastener to a support in such position that the protuberance is adapted to receive a bolt or screw applied through a bolt passage in a part to be secured to said support and engaged with said thread engaging means of the fastener, the interior of said protuberance being formed to cooperate with the head of the bolt or screw in engaging opposite faces of said part adjacent the bolt passage therein to deform the surrounding material into a countersink seating the bolt or screw head in countersunk relation to said part secured to the support.

6. Fastening means for providing a flush-type bolt or screw fastened installation comprising a retainer adapted to be attached to a supporting part across an opening therein, a sheet metal fastener carrying thread engaging means and an attaching portion adapted for attaching said fastener to the retainer, an apertured protuberance provided on said attaching portion of the fastener underlying and extending toward said thread engaging means, said protuberance being adapted to receive a bolt or screw applied through a bolt passage in a sheet metal part to be secured to said supporting part and engaged with said thread engaging means to connect said parts, said protuberance being formed to cooperate with said bolt or screw head in engaging opposite faces of said sheet metal part adjacent the bolt passage therein to deform and draw the surrounding metal into a countersink seating said bolt or screw head in countersunk relation to said sheet metal part.

7. Fastening means for providing a flush-type bolt or screw fastened installation comprising a retainer adapted to be attached to a supporting part across an opening therein, a sheet metal fastener carrying thread engaging means and an attaching portion for attaching said fastener to the retainer, an apertured generally frusto-conical protuberance provided on said attaching portion of the fastener underlying and extending toward said thread engaging means and occupying an opening in said retainer, said protuberance being adapted to receive a bolt or screw applied through a bolt passage in a sheet metal part to be secured to said supporting part and engaged with said thread engaging means to connect said parts, said bolt or screw having a frusto-conical countersinking head and said generally frusto-conical protruberance being designed to cooperate with said head in engaging opposite faces of said sheet metal part adjacent the bolt passage therein to deform and draw the surrounding metal into a countersink seating said bolt or screw head in countersunk relation to said sheet metal part.

8. A fastener for providing a flush-type bolt or screw fastened installation comprising a sheet metal body having a section provided with integral thread engaging means struck and formed therefrom and an integral attaching section made by a return bend of the body and provided with a generally frusto-conical protuberance underlying and extending toward said integral thread engaging means, the attaching section being extended to provide lateral flange means having openings to receive devices for attaching the fastener to a supporting part, said protuberance being adapted to receive a bolt or screw applied through a bolt passage in a sheet metal part to be secured to said supporting part and engaged with said thread engaging means to connect said parts, said bolt or screw having a frusto-conical countersinking head and said generally frusto-conical protuberance being designed to cooperate with said head in engaging opposite faces of said sheet metal part adjacent the bolt passage therein to deform and draw the surrounding metal into a countersink seating said bolt or screw head in countersunk relation to said sheet metal part.

9. A fastener for providing a flush-type bolt or screw fastened installation comprising a sheet metal body defining a section carrying thread engaging means and a section provided with an apertured protuberance underlying and extending toward said thread engaging means, and flange means on one of said sections for attaching the fastener to a supporting part, said protuberance being adapted to receive a bolt or screw applied through a bolt passage in a sheet metal part to be secured to said supporting part and engaged with said thread engaging means of the fastener to connect said parts, said protuberance being adapted to cooperate with said bolt or screw head in engaging opposite faces of said sheet metal part adjacent the bolt passage therein to deform and draw the surrounding metal into a countersink seating said bolt or screw head in countersunk relation to said sheet metal part.

10. A fastener for providing a flush-type bolt or screw fastened installation comprising a generally U-shaped sheet metal body defining a pair of spaced arms extending in the same general direction and adapted to receive therebetween a supporting part having a bolt passage, thread engaging means carried by one of said arms, and an apertured protuberance provided on the other arm underlying and extending toward said thread engaging means and adapted to be received in the bolt passage in the supporting part to maintain the fastener in attached relation thereon, said protuberance being adapted to receive a bolt or screw applied through a bolt passage in a sheet metal part to be secured to said supporting part and engaged with said thread engaging means to connect said parts, said protuberance being designed to cooperate with said bolt or screw head in engaging opposite faces of said sheet metal part adjacent the bolt passage therein to deform and draw the surrounding metal into a countersink seating said bolt or screw head in countersunk relation to said sheet metal part.

GEORGE A. TINNERMAN.